United States Patent [19]

Mark

[11] 4,073,768

[45] * Feb. 14, 1978

[54] NON-OPAQUE FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 626,935

[22] Filed: Oct. 29, 1975

Related U.S. Application Data

[63] Continuation-in-part of Ser. No. 429,126, Dec. 28, 1973, Pat. No. 3,978,024.

[51] Int. Cl.$^2$ .............................................. C08K 5/42
[52] U.S. Cl. .............................. 260/45.7 S; 260/823; 260/824 R
[58] Field of Search ................. 260/49, 45.7 S, 823, 260/824, 47 XA

[56] References Cited

U.S. PATENT DOCUMENTS

| | | | |
|---|---|---|---|
| 2,141,893 | 12/1938 | Zitscher et al. | 252/149 |
| 2,283,236 | 5/1942 | Soday | 117/139.5 |
| 2,815,301 | 12/1957 | Murdock | 260/505 |
| 2,956,956 | 10/1960 | Strauss et al. | 260/505 |
| 3,374,210 | 3/1968 | Muller et al. | 260/505 |
| 3,576,617 | 4/1971 | Bellu | 260/45.7 |
| 3,686,362 | 8/1972 | Hinckley et al. | 260/45.95 |
| 3,775,367 | 11/1973 | Nouvertne | 260/45.7 |

OTHER PUBLICATIONS

ACS Div. Polymer Chem. Polymer Preprints–vol. 12, No. 1, Mar. 1971, p. 794.

Primary Examiner—V. P. Hoke
Attorney, Agent, or Firm—William F. Mufatti

[57] ABSTRACT

A non-opaque flame retardant polycarbonate composition comprising in admixture an aromatic carbonate polymer and an additive which may be the metal salts of either monomeric or polymeric phenol ester sulfonic acids, or mixtures thereof; said aromatic carbonate polymer and additive having a refractive index in the range of 1.54 to 1.65.

18 Claims, No Drawings

NON-OPAQUE FLAME RETARDANT POLYCARBONATE COMPOSITION

This application is a Continuation-in-Part of Patent Application Ser. No. 429,126, filed Dec. 28, 1973, now U.S. Pat. No. 3,978,024, issued Aug. 31, 1976.

This invention is directed to a non-opaque flame retardant polycarbonate composition and in particular an aromatic polycarbonate containing in admixture therewith an additive which may be the metal salts of either monomeric or polymeric phenol ester sulfonic acids or mixtures thereof wherein said aromatic polycarbonate and additive have a refractive index in the range of 1.54 to 1.65.

BACKGROUND OF THE INVENTION

With the increasing concern for safety, there if a positive move towards providing safe materials for public and household use. One particular area of need is that of providing flame resistant or flame retardant non-opaque products for use by the ultimate consumer. As a result of this demand, many non-opaque products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

In many instances, it is desirable that articles produced from these fire retardant polycarbonate resins retain their non-opaque characteristics.

DESCRIPTION OF THE INVENTION

It has now been surprisingly discovered that an aromatic polycarbonate can be made flame retardant while retaining its non-opaque characteristics by incorporating with the aromatic polycarbonate 0.001 to about 2.0 parts per hundred parts of aromatic polycarbonate of certain additives, which additives are inert and do not degrade the aromatic polycarbonate.

The shaped article of the present invention is that comprising an aromatic carbonate polymer and from 0.001 to about 2.0 parts per hundred parts of aromatic carbonate polymer of an additive which is the metal salt of either the monomeric or polymeric substituted and unsubstituted phenol ester sulfonic acid and mixtures thereof wherein the shaped article has a refractive index in the range of 1.54 to 1.65. Particularly preferred shaped articles are in the form of a sheet and a pellet.

The refractive indicies of the materials herein are determined by the immersion method as described in *Physical Methods of Organic Chemistry*, by Arnold Weissberger, Interscience Publishers, Volume II, 1960 (page 1433).

When the refractive index of the instant additives is in the range of the refractive index of the aromatic carbonate polymer, i.e., 1.54 to 1.65, the polycarbonate composition and shaped article produced therefrom is non-opaque. This means that it is able to transmit light and is from translucent to transparent. Depending upon how close the refractive index of the additive is to that of the polycarbonate, this will determine whether the resulting composition is transparent or translucent. If the additive at the concentration employed is partially or totally soluble in the polycarbonate polymer, the more transparent the composition and resulting article will be.

More specifically, the particular additive of this invention is the metal salt of either the monomeric or polymeric substituted and unsubstituted phenol ester sulfonic acid and includes mixtures thereof having a refractive index in the range of 1.54 to 1.65. The metal salt employed in the practice of this invention is either the alkali metal or alkaline earth metal salt or mixtures of these. The metals of these groups are sodium, lithium, potassium, rubidium, cesium, beryllium, magnesium, calcium, strontium and barium.

When the phenol ester sulfonic acid employed in the practice of this invention is a substituted phenol ester sulfonic acid, the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc., 1962 (pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

In the practice of this invention, the types of sulfonic acids employed herein may be either the monomeric form or the polymeric form or mixtures of these. When first considering the monomeric form, the metal salt of the unsubstituted and substituted monomeric phenol ester sulfonic acid can best be represented by the following formula:

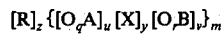   I.

wherein A and B are independently selected from the following formula:

   II.

wherein R' is an aromatic radical of one to four aromatic nuclei, M is a metal which may be selected from the periodic table of either an alkali metal or an alkaline earth metal, R" is an electron withdrawing radical, n is an integer of 0 to 4 and p is an integer of 0 to 10, provided, however, that the sum of n must be at least 1.

In Formula I above, [R] is an organic radical of 1–20 carbon atoms and is either alkyl, aralkyl, alkenyl, aralkenyl, aryl, arylene, alkylene, aralkylene, aralkenylene, alkylidene, aralkylidene, alkenylidene or aralkenylidene and the group compirsing [A] and [B] as well as a trivalent and tetravalent aromatic nucleus. It should also be understood that the radical [R] can also contain halogen substituents which would be an electron withdrawing radical and sulfonic acid salt substituents. In Formula I, [X] is a di-, tri- or tetravalent radical selected from the following:

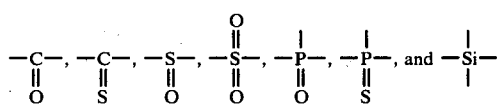

$y$ is an integer of 1–2, $m$, $u$, $q$ and $r$ are integers of 1–4 and $z$ is an integer of 0–3, $v$ is an integer of from 0–4, and O is oxygen.

In the above Formula I, the presence of the (SO$_3$M) radical on the phenol ester is the novel feature of the instant invention that offers the excellent flame retardant properties when admixed with an aromatic polycarbonate.

Actually, while there are many compounds that meet the requirements of Formula I and which offer excellent flame retardant characteristics to an aromatic polycarbonate, the preferred additive employed in the monomeric form is the sodium salt of the sulfonic acid of dichlorophenyl 2,4,5-trichlorobenzenesulfonate. This has the following formula:

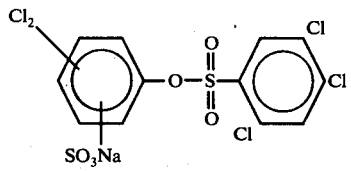

When the polymeric form of the unsubstituted and substituted aromatic sulfonic acid is employed in the practice of this invention, it can best be represented by the following formula:

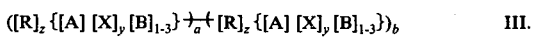

wherein A and B are independently selected from the following formula:

wherein (O), R', M, R", $n$, $p$ and $q$ have the same meaning as cited previously. In addition, [R], [X] and $z$ have the same meaning as cited previously. Also, the same requirements for $n$ are also applicable. In Formula III, $a$ is an integer of from 0–2000 and $b$ is an integer of from 0–2000, provided, however, that the sum of $a$ and $b$ must be at least 4 and can be as high as 2000. As shown, the selections of $a$ and $b$ can be random or equal or one can be zero (0).

In the practice of this invention, it is to be understood that the polymeric structure can be either a homopolymer, a copolymer, a random copolymer, a block copolymer or a random-block copolymer, or mixtures of these polymeric forms. In addition, the ratio of sulfonated phenolic rings to unsubstituted phenolic rings can vary from 1 to 1 to as high as that which is barely necessary to render the polycarbonate flame retardant and this may be 1 to 1000.

While there are many compounds that meet the requirements of Formula III and which offer excellent flame retardant characteristics to an aromatic polycarbonate, the preferred employment of the instant invention is provided by the application of Formula III in its simplest form, which is the metal salt of a sulfonated polycarbonate itself. In this version then, the metal sulfonate (SO$_3$M) function is attached directly to the polycarbonate backbone itself, a feature which precludes eventual migration or plating out phenomena. The sulfonation of the polycarbonate, which may be a homopolymer or a copolymer (random, block or random-block copolymer) is then carried out to provide the metal sulfonate (SO$_3$M) radical in 0.01 to 10% concentration in the polymer. It is understood that part or all of the effective species may also be introduced separately by compounding a non-sulfonated polycarbonate with a sulfonated one. In addition, a partially sulfonated polycarbonate may also contain fire retardant additives represented by Formulae I and III. It is further understood that mixtures of this version of the instant invention can also be used.

The compositions of the instant invention may contain fillers, pigments, dyes, antioxidants, stabilizers, ultraviolet light absorbers, mole release agents and other additives commonly employed in non-opaque polycarbonate resin formulations. Furthermore, the shaped articles may be coated with, for example, mar or scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 0.01 part of a finely ground dehydrated additive listed in TABLE I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by 1/16-⅛ in. thick into test squares of about 2 in. by 2 in. by about ⅛ in. thick. The test bars (5 for each additive listed in the TABLE) are subject to the test procedure set forth in Underwriters' Laboratories, Inc. Bulletin UL-94, Burning Test for Classifying Materials. In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ¼" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

The test squares are tested for light transmission in a Gardner XL 10-CDM instrument. The data shows the amount of incident light transmitted by the test squares using air as 100% transmission.

The results of an additive within the scope of the instant invention is as follows with a control being the aromatic polycarbonate as prepared above without the additive of the type set forth herein.

TABLE 1

| Additive (0.01 parts per hundred) | Light Transmission (%) | Flame Out Time Seconds | No. of Drips Per five test bars | UL-94 Rating |
|---|---|---|---|---|
| CONTROL | 86 | 24 | 13 | Burning |
| Potassium salt of 4-chloro-3-sulfophenyl benzoate | 86 | 8.6 | 3 | V-II |

EXAMPLE II

This Example is set forth to demonstrate the effect of the additives of this invention at limits of 0.10 parts per hundred parts of the polycarbonate.

In preparing the test specimens for this Example, 100.00 parts of the polycarbonate of Example I is mixed with 0.10 parts of the additives listed in TABLE 2 employing the same procedure. Test specimens are then molded using the same procedure employed in Example I. The test specimens are subjected to the same test procedure of Example I with the following results:

TABLE 2

| Additive (0.10 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Sodium [phenyl 2,4,5-trichlorobenzenesulfonate]-4'-sulfonate | 83 | 3.6 | 0 | V-0 |
| Potassium triphenyl phosphate-4-sulfonate | 80 | 7.0 | 0 | V-I |
| Dipotassium bis-(4-sulfophenyl) | 83 | 5.6 | 0 | V-I |

TABLE 2-continued

| Additive (0.10 parts per hundred) | Light Transmission (%) | Flame Out Time Seconds | No. of Drips Per five test bars | UL-94 Rating |
|---|---|---|---|---|
| benzenephosphanate | | | | |

EXAMPLE III

This Example is set forth to demonstrate the effect of the additives of this invention at limits of 0.20 parts per hundred parts of the polycarbonate.

In preparing the test specimens for this Example, 100.00 parts of the polycarbonate of Example I is mixed with 0.20 parts of the additives listed in TABLE 3 employing the same procedure. Test specimens are then molded using the same procedure employed in Example I. The test specimens are subjected to the same test procedure of Example I with the following results:

TABLE 3

| Additive (0.20 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Potassium diphenylsulfate-4-sulfonate | 78 | 6.2 | 0 | V-I |
| Polysodium (bis-phenol-A)(tetabromobisphenol-A) copolycarbonate-polysulfonate | 84 | 2.8 | 0 | V-O |

EXAMPLE IV

This Example is set forth to show the effect of a known commercially available flame retardant additive.

Example I is repeated except that in place of the additives employed therein, only 1 part decabromodiphenyl ether is used herein. The results obtained upon evaluating five test bars are the same as obtained for the Control shown in TABLE 1 above.

In the practice of this invention, aromatic carbonate polymers are rendered flame retardant by the addition of certain particular additives which are the metal salts of substituted and unsubstituted monomeric or polymeric phenol ester sulfonic acids, or mixtures of these. The amount of the additives employed in the practice of this invention may vary from 0.001 to up to about 2.0 parts per hundred parts of aromatic polycarbonate.

As indicated previously, the additive of the instant invention comprises the alkali or alkaline earth metal salts of the substituted and unsubstituted monomeric or polymeric phenolic ester sulfonic acids or mixtures of these. While a great number of such salts are set forth in the tables of the Examples of the instant invention, these are only a representative sample of the additives of this invention. The sodium, calcium, magnesium, potassium, strontium, lithium, barium, rubidium and cesium salts of other aromatic sulfonic acids can be employed in place of those of the Examples with the same effective flame retardancy being achieved. These other aromatic sulfonic acids are:

triphenyl trimellitate disulfonic acid
4-chlorophenyl thionobenzoate sulfonic acid
4,4'-dichlorodiphenylsulfite disulfonic acid
4,5-dibromophenyl benzenesulfonate sulfonic acid
diphenyl sulfate sulfonic acid tri(α-naphthyl)phosphate trisulfonic acid
hydroquine bis(phenyl phenylphosphonate)sulfonic acid
tetrabromobisphenol-A-bis(r-chlorophenyl sulfate) disulfonic acid
diphenyl dibromomaleate disulfonic acid
bisphenol-A-bis bis(4-chlorophenyl)thiophosphate disulfonic acid
poly(diphenylsiloxane)polysulfonic acid
poly(bisphenol-A-tetrachlorobisphenol-A)polysulfonic acid
bisphenol-A-bis(2,4,5-trichlorobenzenesulfonate)sulfonic acid In the practice of this invention, the additive or the sulfonated polymer are prepared by sulfonation methods well known in the art. For example, one sulfonates the phenol ester or the (phenol ester) polymer (such as the polycarbonate) by subjecting it, in solution, to the action of liquid $SO_3$ and by neutralizing the resultant sulfonic acid. The salt is then recovered by precipitation or by distillation of the solvent.

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)-propane, 2,2-(3,5,3',5'-tetrabromo-4,4'-dihydroxydiphenyl)propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester of a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinnone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylpehnol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be on which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bormide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bormide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxy, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

As stated previously, mixtures can be employed herein. These mixtures can consist of, for example, (a) mixtures of metal salts of unsubstituted and substituted monomeric phenol ester sulfonic acids, (b) mixtures of metal salts of unsubstituted and substituted polymeric phenol ester sulfonic acids, (c) mixtures of (a) and (b), and (d) mixtures of any of the above with metal salts of sulfonic acid substituted carbonate polymers. The mixtures herein offer certain advantages in providing flame retardancy of V-O rating of 5 test bars and essentially no drips per bar.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A non-opaque flame retardant carbonate polymer composition selected from the group consisting of:
   a. an aromatic carbonate polymer having in admixture from 0.001 to about 2.0 parts per hundred parts of the carbonate polymer of an additive selected from the group consisting of the metal salts of unsubstituted and substituted monomeric phenol ester sulfonic acid and the metal salt of unsubstituted and substituted polymeric phenol ester sulfonic acid, and mixtures thereof, wherein the metal salts are selected from the group consisting of the alkali metal salts and alkaline earth metal salts and mixtures of these metal salts, and the substituent on the metal salts of the substituted monomeric and polymeric phenol ester sulfonic acid is selected from the group consisting of an electron withdrawing radical, and mixtures of electron withdrawing radicals;
   b. an aromatic carbonate polymer containing from 0.001 to about 2.0 parts per hundred parts of the carbonate polymer of a metal salt of a sulfonic acid substituted carbonate polymer; and
   c. mixtures of (a) and (b); said carbonate polymer and additive having a refractive index in the range of 1.54 to 1.65.

2. A shaped article having a refractive index in the range of 1.54 to 1.65 comprising a carbonate polymer composition selected from the group consisting of:
   a. an aromatic carbonate polymer having in admixture from 0.001 to about 2.0 parts per hundred parts of the carbonate polymer of an additive selected from the group consisting of the metal salts of unsubstituted and substituted monomeric phenol ester sulfonic acid, and mixtures thereof, wherein the metal salts are selected from the group consisting of the alkali metal salts and alkaline earth metal salts and mixtures of these metal salts, and the substituent on the metal salts of the substituted monomeric and polymeric phenol ester sulfonic acid is selected from the group consisting of an electron withdrawing radical, and mixtures of electron withdrawing radicals;
   b. an aromatic carbonate polymer having in admixture from 0.001 to about 2.0 parts per hundred parts of the carbonate polymer a metal salt of a sulfonic acid substituted carbonate polymer; and
   c. mixtures of (a) and (b).

3. The shaped article of claim 2 wherein the electron withdrawing radical is selected from the group consisting of halo-, nitro-, trihalomethyl-, and cyano- radicals, and mixtures thereof.

4. The shaped article of claim 2 wherein the metal salt of the unsubstituted and substituted monomeric phenol ester sulfonic acid has the following formula:

$$[R]_z\{[O_qA]_u[X]_y[O_rB]_v\}_m \qquad \text{I.}$$

wherein A and B are independently selected from the following formula:

$$R'(SO_3M)_nR''_p \qquad \text{II.}$$

wherein R' is an aromatic radical of 1-4 atomatic nuclei, M is a metal selected from the group consisting of alkali metal and alkaline earth metal, R" is an electron withdrawing radical, $u$, $q$, and $r$ are integers of from 1-4, $n$ and $v$ are integers of from 0-4 and $p$ is an integer of from 0-10; provided that the sum of $n$ when employed in Formula I must be at least 1; and further, wherein in Formula I, [R] is an organic radical of 1-20 carbon atoms and is selected from the group consisting of alkyl, aralkyl, alkenyl, aralkenyl, aryl, arylene, alkylene, aralkylene, alkenylene, aralkenylene, alkylidene, aralkylidene, alkenylidene, aralkenylidene, A and B, $z$ is an integer of from 0-3, [X] is selected from the group consisting of:

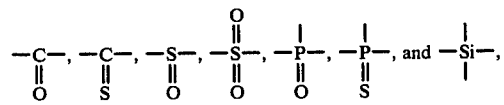

$y$ is an integer of from 1-2, $m$ is an integer of from 1-4 and O is oxygen.

5. The shaped article of claim 4 wherein the metal salt is $$[R]_1\,[(O)_1R'(SO_3M)_nR''_p][X])_2$$

6. The shaped article of claim 4 wherein the electron withdrawing radical is chlorine.

7. The shaped article of claim 2 wherein the metal salt is sodium [2,4,5-trichlorobenzensulfonate]-4'-sulfonate.

8. The shaped article of claim 2 wherein the metal salt is dipotassium bis(4-sulfophenyl) benzenephosphonate.

9. The shaped article of claim 2 wherein the metal salt of the unsubstituted and substituted polymeric phenol ester sulfonic acid has the following formula:

$$([R]_z\{[A][X]_y[B]_{1-3}\})_a\hspace{-0.5em}+\hspace{-0.5em}[R]_z\{[A][X]_y[B]_{1-3}\})_b$$

wherein A and B are independently selected from the following formula:

$$(O)_qR'(SO_3M)_nR''_p$$

wherein R' is an aromatic radical of 1-4 aromatic nuclei, O is oxygen, M is a metal selected from the group consisting of alkali metal and alkaline earth metal, R" is an electron withdrawing radical, $q$ is an integer of from 1-4, $n$ is an integer of from 0-4 and $p$ is an integer of from 0-10; and wherein in Formula I, [R] is an organic radical of 1-20 carbon atoms and is selected from the group consisting of alkyl, aralkyl, alkenyl, aralkenyl, aryl, arylene, alkylene, aralkylene, alkenylene, aralkenylene, aklylidene, aralkylidene, alkenylidene, aralkenylidene, [A] and [B], $z$ is an integer of from 0-1, [X] is selected from the group consisting of:

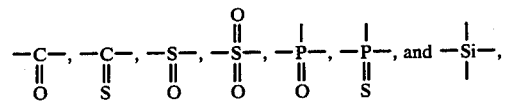

$y$ is an integer of from 1-2, $m$ is an integer of from 1-4 and $a$ is an integer of from 0-2000 and $b$ is an integer of from 0-2000; provided, however, that the sum of $a$ and $b$ must equal at least 4 and further provided that the sum of $n$ when employed in Formula I must be at least 1.

10. The shaped article of claim 9 wherein the electron withdrawing radical is selected from the group consisting of halo-, nitro-, trihalomethyl- and cyano- and mixtures thereof.

11. The shaped article of claim 9 wherein the electron withdrawing radical is chlorine.

12. The shaped article of claim 9 wherein M is sodium.

13. The shaped article of claim 9 wherein the metal salt is polysodium [(bisphenol-A)-(tetrabromobisphenol-A) copolycarbonate]-polysulfonate.

14. The shaped article of claim 2 wherein the metal salt of a sulfonic acid substituted sulfonated carbonate polymer is polysodium [(bisphenol-A)-tetrabromobisphenol-A) copolycarbonate] polysulfonate having therein 1.1 weight percent of ($SO_3Na$) radical and 0.8 weight percent bromine based on the weight of the polymer.

15. The shaped article of claim 2 wherein the metal salt of a sulfonic acid substituted sulfonated carbonate polymer is polysodium (bisphenol-A-polycarbonate) polysulfonate having therein 1.1 weight percent of ($SO_3Na$) radical based on the weight of the polymer.

16. The shaped article of claim 2 wherein the metal salt of a sulfonic acid substituted sulfonated copolyester carbonate polymer is polysodium (bisphenol-A)(isophthalic acid-terephthalic acid)(copolyestercarbonate) polysulfonate having therein 2.7 weight percent of ($SO_3Na$) radical based on the weight of the polymer.

17. The shaped article of claim 2 in the form of a sheet.

18. The shaped article of claim 2 in the form of a pellet.

* * * * *

UNITED STATES PATENT AND TRADEMARK OFFICE
CERTIFICATE OF CORRECTION

PATENT NO. : 4,073,768
DATED : February 14, 1978
INVENTOR(S) : Victor Mark

It is certified that error appears in the above-identified patent and that said Letters Patent are hereby corrected as shown below:

Col. 4, line 32, "mole" should be -- mold --
(See spec page 7, line 5)

Col. 6, Table 3, third additive should read -- Polysodium (bisphenol-A)(tetrabromobisphenol-A) copolycarbonate-polysulfonate --

Col. 6, Table 2, under "Additive" column, should read -- benzenephosphonate --

Col. 8, line 42, "carboxy" should be -- carboxyl --
(See spec page 17, line 13)

Col. 10, line 3, "R' " should be -- R'' --

, claim 5, the formula should read:

-- $[R]_z[(O)_q R'(SO_3M)_n R''_p][X])_2$ --

, claim 7, line 2, before "2,4,5" and after the bracket insert -- phenyl --

Signed and Sealed this

Ninth Day of May 1978

[SEAL]

Attest:

RUTH C. MASON
Attesting Officer

LUTRELLE F. PARKER
Acting Commissioner of Patents and Trademarks